July 1, 1958
D. H. KEISER, JR
2,840,976
GRASS CUTTING SHEARS AND THE LIKE
Filed Oct. 1, 1956
2 Sheets-Sheet 1
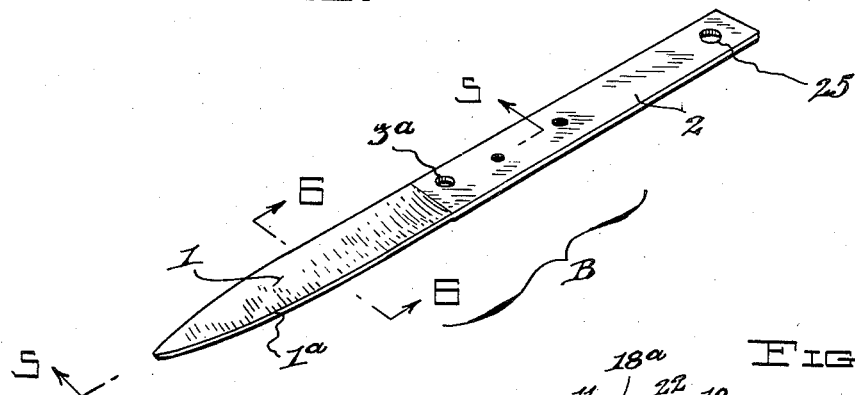
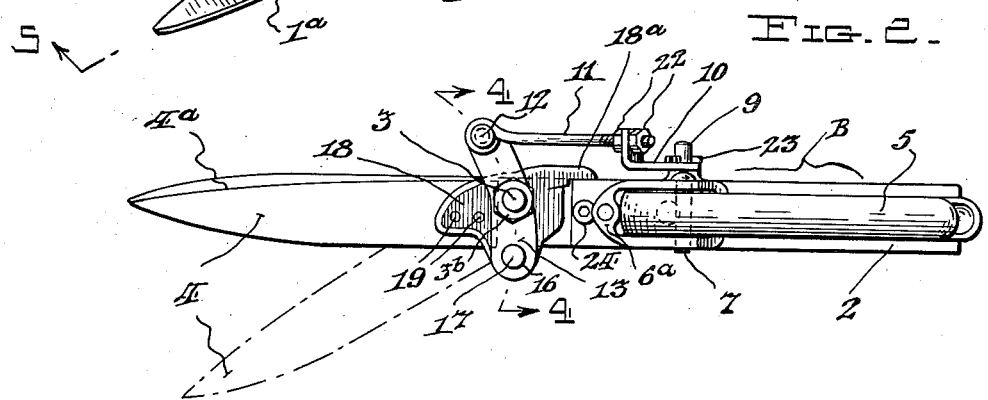
INVENTOR:
David H. Keiser, Jr.,
BY
Alfred E. Tschinger
ATTORNEY.

July 1, 1958 D. H. KEISER, JR 2,840,976
GRASS CUTTING SHEARS AND THE LIKE
Filed Oct. 1, 1956 2 Sheets-Sheet 2

INVENTOR:
David H. Keiser, Jr.,
BY
Alfred E. Tschinger
ATTORNEY.

United States Patent Office 2,840,976
Patented July 1, 1958

2,840,976

GRASS CUTTING SHEARS AND THE LIKE

David Howard Keiser, Jr., West Lawn, Pa.

Application October 1, 1956, Serial No. 613,105

7 Claims. (Cl. 56—241)

This invention relates to one-hand operated grass cutting shears, clippers and similar implements that are adapted to be utilized in usual and well known manner to perform grass cutting operations and the like, and more particularly concerns a novel implement of this type that can be utilized in such usual and well known manner and can also be utilized to perform its operation while seated on the ground in stable, upright, brace-forming relation with the user of the implement.

Standard, or conventional, one-hand operated grass cutting implements, or shears, of the type indicated, have heretofore been provided in a variety of different structural forms. In use, such implements are all adapted to be normally operated adjacent the ground and at different spaced locations therefrom, as desired, or determined by the user of the implement in connection with the performance of the grass trimming, clipping, or other similar cutting operations. In order that such an implement may be held by hand at the proper grass cutting height, level, or location, above the ground, it becomes necessary for the person utilizing the implement to bend, or stoop, forwardly, or to assume a knee-flexed squatting, crouching, or other position, that is more or less uncomfortable, fatiguing, or otherwise detrimental, particularly to older persons.

One object of my invention is to provide a novel grass cutting implement, or shears, of the type indicated, which cannot only be operated with one hand in the usual and well known manner of the similar prior art implements, but can additionally be similarly operated while seated on the ground in a stable, upright, brace-forming relationship with the user of the implement, so as to substantially eliminate, or greatly alleviate, the above referred to uncomfortable, fatiguing, or other detrimental effects on the implement user.

Another object is to provide such an implement having certain novel structural and functional features of advantage over the similar implements of the prior art.

A further object is to provide such an implement that can be seated in stable, upright position on the ground and which includes a stationary handle member arranged so that the implement user can conveniently rest his hand thereagainst for the purpose of bracing, or supporting himself in connection with the utilization of the implement.

It is also an object to provide such an implement having a novel and simple base-forming structure, which permits seating of the implement in stable, upright position, on the ground, or on some other surface, for one purpose or another.

Another object is to provide such an implement in which the said base-forming structure consists of one of the cutting blades of the implement and an integral elongated, flat, extension member formed thereon and projecting rearwardly therefrom.

Another feature of the invention resides in the provision of such an implement having a base-forming structure comprising a cutting blade and an elongated extension member that projects rearwardly therefrom a distance at least equal to the length of the cutting blade.

An additional object is to provide such an implement in which the said base-forming structure is provided with means adjacent the rear end thereof adapted for connection with a supporting element located on a wall, or elsewhere, to thereby facilitate out-of-the-way storage of the implement when not in use.

Another object is to provide such an implement having a pair of cutting blades, one of which is hollow ground and includes a special extension member.

Still another object is to provide novel grass shears comprising, a base-forming structure having a pair of cutting blades arranged in cooperative cutting relation at the forward end thereof in such manner as to enable the blades to perform their grass severing function while the base-forming structure is seated on the ground to effect positioning of the shears in stable, upright, grace-forming relation with the user of the shears, a handle member fixedly secured to said base-forming structure so as to extend in spaced relation above the latter, a movable handle member operatively arranged between said fixedly secured handle member and said base-forming structure, and means actuated by said movable handle member to effect cutting action of said blades.

With these and other objects in view, which will become more readily apparent from the following detailed description of the various unique, practical and illustrative grass cutting implement improvements shown in the accompanying drawings, my invention comprises the novel grass shears or the like, elements, features of construction and arrangement of parts in cooperative relationship, as more particularly indicated and defined by the hereto appended claims.

In the accompanying drawings:

Figure 1 is a perspective view of one illustrative type of base-forming structure for grass shears in accordance with my invention.

Fig. 2 is a top plan view of one form of grass shears in accordance with my invention.

Fig. 3 is a side elevational view of the grass shears shown in Fig. 1.

Figure 5:
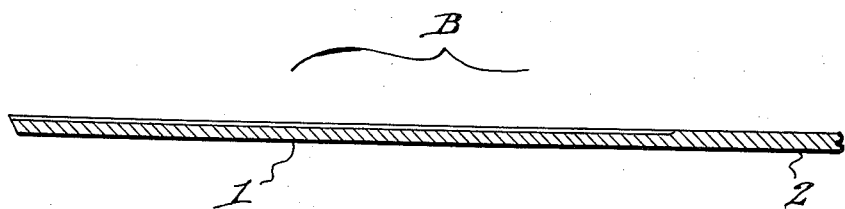
Figure 6:
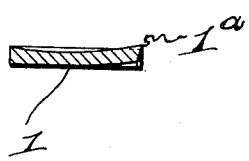

Figs. 5 and 6 are enlarged sectional views taken, respectively, as indicated by the arrows 5—5 and 6—6 on Fig. 1.

For purposes of exemplification, or illustration, my invention is herein disclosed in the form of one practical form of grass cutting implement, or shears. From this disclosure, it will be readily apparent to those skilled in this art how my invention can be embodied, or applied, in the same or in similar manner, to other types of such implements.

Referring to the drawings, the grass cutting implement, or shears, generally comprises a base-forming, or supporting structure B, which, in the present instance, is formed of a single piece of sheet steel and includes a stationary cutting blade member 1 having an integral, flat, elongated extension member 2 projecting rearwardly therefrom; a pivot stud 3 that is fixedly connected to the structure B so as to project upwardly therefrom; a movable cutting blade 4; a stationary handle member 5 that is fixedly connected to the base-forming structure B so as to extend in spaced parallel relation above the latter; a movable handle member 6; a pivot pin 7 that is anchored on the handle member 5 and on which the movable handle member 6 is pivotally supported; a helical compression spring 8; a pivot stud 9 that is fixed on the handle member 6; and means actuated by said movable handle member 6 adapted to effect cutting action of the blades 1 and 4, which means includes a right-angular bracket 10, one leg of which is pivotally secured to the stud 9, an adjustable connecting link 11, a pivot stud 12 that is fixedly secured to one end of a flat lever plate 13 loosely mounted for turning movement on the fixed stud 3, between two spiral spacing springs 14 and 15, the other end of which lever plate 13 is provided with an aperture 16 through which extends a stud 17 fixed on a plate 18, secured to the movable blade 4 by two rivets 19.

The cutting blade 1, that constitutes the forward portion of the base-forming structure B, is hollow ground and provided with a cutting edge 1a along one side thereof.

The pivot stud 3 is located rearwardly of the cutting blade 1 and fixed in position on the base-forming structure B by having a lower end shouldered portion thereof extending through an aperture 3a in the structure B, the bottom end of which shouldered portion is riveted over against the bottom surface of the structure B, as shown in Fig. 3.

The movable cutting blade 4 is also hollow ground to provide a cutting edge 4a and is pivotally mounted for swinging movement on the stud 3, which latter extends through an aperture provided for this purpose in the blade 4 and through a similar alignedly arranged aperture in the plate 18 that is fixed to the blade 4. The said apertures in the blade 4 and plate 18 are of somewhat larger diameter than the pivot stud 3, so as to provide a loose pivotal connection of the blade 4 on the stud 3 to such an extent that the blade 4 is laterally and angularly tiltable on the stud 3 in connection with the performance of its cutting action with the stationary blade 1.

Figure 4:
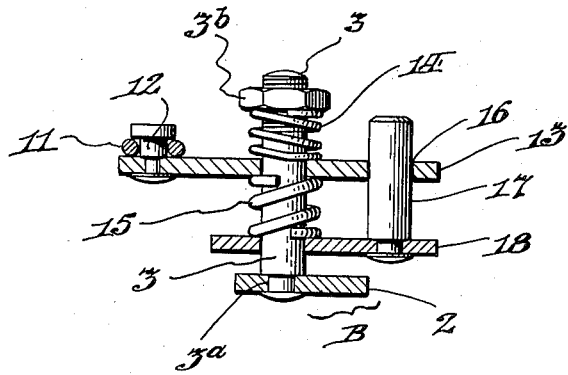
Fig. 4 is an enlarged detail sectional view, taken substantially as indicated by the arrows 4—4 on Fig. 2.

The lever plate 13 is floatingly supported between the spacing springs 14 and 15 and the aperture in the lever plate 13 through which the stud 3 extends is also of somewhat larger diameter than the stud 3 so that the lever plate 13 may tilt in connection with its turning movement about the stud 3. The upper end of the stud 3 is threaded and has mounted thereon adjusting nut 3b that may be turned in one direction or the other so as to effect proper elevational positioning adjustment of the plate lever 13 on the stud 3 between the springs 14 and 15. As shown in Fig. 4, the spring 15 may be made of heavier gauge spring wire than the spring 14, so as to provide a fine degree of elevational positioning adjustment of the plate lever 13 on the stud 3 characteristic of such an arrangement.

The connecting link 11 is threaded at one end for lengthwise adjusted connection with one leg of the bracket 10, through which it extends and to which it is secured by lock nuts 22 arranged at opposite sides of the said bracket leg through which the threaded portion of the connecting link 11 extends. If desired, such lengthwise adjusted connection between the link 11 and bracket 10 may also be effected in some other manner. For example, by threading the aperture in the bracket leg through which the threaded portion of the connecting link 11 extends and utilizing only one of the lock nuts 22 to effect locked engagement of the link 11 with the bracket 10, after the length adjustment has been made by turning the bracket on the link before the latter is engaged on the pivot stud 9 and maintained thereon by means such as a cotter pin indicated at 23. The other end of the connecting link 11 is circularly turned or bent so as to be loosely engageable with the stud 12, that is fixed to one end of the plate lever 13 as shown in Fig. 4.

The stationary handle member 5 has a vertically extending portion 5a integrally formed therewith that is shaped as shown in Fig. 3. The bottom end of the portion 5a is fixedly secured to the base-forming structure B by suitable means, such as by the two screw bolts indicated at 24, the lower threaded shank portions of which are anchored in threaded apertures provided therefor in the base forming structure B as shown in Figs. 1 and 3. A spring supporting member 5b is provided at the front of the handle portion 5a from which projects upwardly a short integral spur-like element that is adapted to extend into the lower end of the helical compression spring 8 when in its seated position on the member 5b.

The movable handle member 6 has an extension 6a integrally formed at its front end against which the upper end of the compression spring 8 is adapted to rest so that the handle member 6 will be urged by the spring 8 to its lower position indicated by the dot-and-dash lines in Fig. 3. A short integral spur-like element also depends from the extension 6a of the handle member 6, which element 6a is adapted to extend into the upper end of the spring 8. The opposed spur-like elements on the extension 6a and portion 5b serve to retain the compression spring 8 in its position on the shears as illustrated by Fig. 3.

The plate 18, that is fixedly secured to the rear upper portion of the movable cutting blade 4 by rivets 19, is shaped as shown in Fig. 2 and is provided with an integral movement stopping projection 18a, one side of which is adapted to abut against the lower end of the vertically extending portion 5a of the stationary handle member 5, when the cutting blades 1 and 4 are in their fully closed position as illustrated by Fig. 2.

The movable cutting blade 4 is provided with a slight downward curvature in lengthwise direction, so as to assure constant contact of the cutting edges 1a and 4a throughout the entire cutting action of the blades 1 and 4 when moved relative to each other to effect such action.

In operation, the shears herein disclosed, function in similar manner to the known type of shears that are adapted to effect positive canting of a movable cutting blade relative to a stationary blade and the exertion of a certain contact or clamping pressure between the cutting edges of said blades, during the cutting operation of the shears. Such prior art shears are disclosed, for example, in my U. S. Patents 2,407,237, 2,281,977, 2,661,534 and 2,744,321.

The cutting blades 1 and 4 are in their fully open or separated relation when the movable blade 4 is in the dot-and-dash position shown in Fig. 2. Blade opening movement is effected by upward pressure of the spring 8 to cause the movable handle member 6 to swing to its lowermost position, indicated by the dot-and-dash lines in Fig. 3, at which time the front edge of a crosswise extending wall portion 6b of the movable handle member 6 will abut against the vertically extending portion 5a of the stationary handle member 5, see Fig. 3.

The handle members 5 and 6 are normally grasped with the right or the left hand in such manner that a palm portion of the hand overlies or rests on the top surface of the stationary handle member 5 with the thumb in downwardly extending relation thereto and the ends of the four fingers positioned, or curled about the bottom surface of the movable handle member 6. By then moving the ends of the four fingers toward and from the palm of the hand in a hand closing and opening manner, the movable handle member 6 will be moved up and down so as to carry out its shear operating movement about the pivot pin 7. Such movement of the handle member 6 will cause the movable cutting blade 4 to be reciprocated about pivot stud 3, toward and away from the stationary cutting blade 1, since the reciprocating movement of the handle member 6 will be transmitted to the blade 4 by the interposed connecting parts comprising the stud 9, bracket 10, connecting link 11, stud 12, lever plate 13 and stud 17 which is anchored to the movable blade 4. Since certain of these connecting parts are loosely joined with each other and relatively positioned as shown, the shearing action that takes place between the cutting blades 1 and 4 involves positive canting of the movable cutting blade 4, relative to the stationary cutting blade 1 and the exertion of a certain contact or clamping pressure between the cutting edges 1a and 4a of said blades, during the cutting operation of the shears, as previously indicated.

As illustrated by Fig. 3, the flat elongated base-forming structure B of the shears, will permit seating of the shears in an upright self-supporting manner on the ground which is indicated in cross-section by the letter G in Fig. 3, in operating relation with the grass which is indicated by the reference character G¹ in said figure. Accordingly, when the shears are so seated on the ground, a user of the shears, while in a forwardly bent, stooping, or knee-flexed squatting, or crouching position, may rest his hand on the fixed handle member 5, as above explained, and conveniently and restfully lean on or brace himself against the shears, in substantially the same manner as would be the case if he placed his hand on the ground while so positioned, while at the same time operating the shears to effect a grass cutting or trimming operation. In this connection, the extension member 2 of the base-forming structure B can be used as a length gauge during the grass cutting procedure.

Whenever desired, the shears can, of course, also be utilized in usual manner, the same as ordinary grass cutting shears. That is to say, they can be operated with one hand while held in any spaced relation above the ground.

To provide for convenient storage of the shears when not in use, the base-forming structure B is provided with a circular aperture 25, adjacent to the outer end of the extension member 2 thereof. This aperture 25 serves as a convenient means for effecting suspension of the shears on a nail or some other similar supporting element, provided for this purpose on a wall, or at some other location where the shears are to be stored.

Of course, the grass cutting shears specifically shown and described can be changed and modified in various ways, without departing from the invention herein disclosed and hereinafter more particularly defined by the appended claims.

I claim:

1. Grass shears of the character described, comprising a base structure that includes a stationary cutting blade and an extension member arranged to project rearwardly of said blade in such manner that said blade and member will combinedly form a stationary ground contacting arrangement for the shears that extends substantially from one end thereof to the other, a handle member fixedly united with said base structure and spacedly arranged above the extension member in substantially parallel relation therewith, a movable cutting blade arranged in cooperative cutting relation with said stationary blade in such manner as to enable said blades to perform their grass severing function while the shears are held in operative position on the ground, a movable handle member operatively arranged between said fixedly united handle member and said base structure, and means actuated by said movable handle member to effect cutting action of said blades.

2. Grass shears of the character described, comprising a base structure that includes a stationary cutting blade and an integral extension member arranged to project rearwardly of said blade in such manner that said blade and member will combinedly form a stationary ground contacting arrangement for the shears that extends substantially from one end thereof to the other, a handle member fixedly united with said base structure and spacedly arranged above the extension member in substantially parallel relation therewith, a movable cutting blade arranged in cooperative cutting relation with said stationary blade in such manner as to enable said blades to perform their grass severing function while the shears are held in operative position on the ground, a movable handle member operatively arranged between said fixedly united handle member and said base structure, and means actuated by said movable handle member to effect cutting action of said blades.

3. Grass shears of the character described, comprising a base structure that includes a stationary hollow ground cutting blade having an integral flat extension member arranged to project rearwardly of said blade in such manner that said blade and member will combinedly form a stationary ground contacting arrangement for the shears that extends substantially from one end thereof to the other, a handle member fixedly united with said base structure and spacedly arranged above the extension member in substantially parallel relation therewith, a movable cutting blade arranged in cooperative cutting relation with said stationary blade in such manner as to enable said blades to perform their grass severing function while the shears are held in operative position on the ground, a movable handle member operatively arranged between said fixedly united handle member and said base structure, and means actuated by said movable handle member to effect cutting action of said blades.

4. Grass shears of the character described, comprising a base structure that includes a stationary hollow ground cutting blade having an integral flat extension member provided with a plurality of apertures and arranged to project rearwardly of said blade in such manner that said blade and member will combinedly form a stationary ground contacting arrangement for the shears that extends substantially from one end thereof to the other, a handle member fixedly united with said base structure and spacedly arranged above the extension member in substantially parallel relation therewith, a movable cutting blade arranged in cooperative cutting relation with said stationary blade in such manner as to enable said blades to perform their grass severing function while the shears are held in operative position on the ground, a movable handle member operatively arranged between said fixedly united handle member and said base structure, and means actuated by said movable handle member to effect cutting action of said blades.

5. A base structure for grass shears that are operative while seated on the ground; comprising a stationary cutting blade, and an integral flat extension member arranged to project rearwardly from said blade in such manner that said blade and member will combinedly form a stationary ground contacting arrangement for the shears that extends substantially from one end thereof to the other.

6. A base structure for grass shears that are operative while seated on the ground; comprising a stationary hollow ground cutting blade, and an integral flat extension member arranged to project rearwardly from said blade in such manner that said blade and member will combinedly form a stationary ground contacting arrangement for the shears that extends substantially from one end thereof to the other.

7. Grass shearers comprising, a base-forming structure consisting of a cutting blade having an integral elongated flat extension member that projects rearwardly therefrom a distance at least equal to the length of the cutting blade, a handle member fixedly united in superimposed spaced relation with said structure and adapted to form a stable hand-supporting brace for the user of the shears when said structure is seated in stationary position on the ground, a movable cutting blade arranged in cooperative cutting relation with the cutting blade of said structure in such manner as to enable the blades to perform their grass severing function while the structure is seated in stationary position on the ground, a movable handle member operatively arranged between said fixedly united handle member and said structure, and means actuated by said movable handle member to effect cutting action of said blades.

References Cited in the file of this patent

UNITED STATES PATENTS

| | | |
|---|---|---|
| 100,218 | Ulrich | Feb. 22, 1870 |
| 1,507,529 | Sundman | Sept. 2, 1924 |
| 2,469,983 | Newbold | May 10, 1949 |
| 2,607,114 | Keiser | Aug. 19, 1952 |
| 2,661,534 | Keiser | Dec. 8, 1953 |
| 2,672,684 | Kalish | Mar. 23, 1954 |
| 2,679,096 | Wallace | May 25, 1954 |
| 2,689,401 | Kalish | Sept. 21, 1954 |
| 2,718,059 | Koschak | Sept. 20, 1955 |